(12) United States Patent
Friedrich et al.

(10) Patent No.: US 10,343,954 B2
(45) Date of Patent: Jul. 9, 2019

(54) GAS GENERATING COMPOSITION AND USE THEREOF IN PEDESTRIAN PROTECTION DEVICES

(71) Applicant: TRW Airbag Systems GmbH, Aschau am Inn (DE)

(72) Inventors: Jorg Friedrich, Munich (DE); Achim Hofmann, Tussling (DE); Karl-Heinz Rodig, Kraiburg (DE); Siegfried Zeuner, Munich (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 526 days.

(21) Appl. No.: 14/794,919

(22) Filed: Jul. 9, 2015

(65) Prior Publication Data

US 2015/0307410 A1 Oct. 29, 2015

Related U.S. Application Data

(62) Division of application No. 13/769,481, filed on Feb. 18, 2013, now abandoned.

(30) Foreign Application Priority Data

Mar. 8, 2012 (DE) .................. 10 2012 004 468

(51) Int. Cl.
| | |
|---|---|
| *C06B 25/34* | (2006.01) |
| *B60R 21/36* | (2011.01) |
| *C06B 29/16* | (2006.01) |
| *C06B 31/12* | (2006.01) |
| *C06D 5/06* | (2006.01) |
| *B60R 21/34* | (2011.01) |

(52) U.S. Cl.
CPC .............. *C06B 25/34* (2013.01); *B60R 21/34* (2013.01); *B60R 21/36* (2013.01); *C06B 29/16* (2013.01); *C06B 31/12* (2013.01); *C06D 5/06* (2013.01)

(58) Field of Classification Search
CPC ...................................................... C06B 25/34
USPC .......................................................... 149/45
See application file for complete search history.

(56) References Cited

U.S. PATENT DOCUMENTS

| | | | |
|---|---|---|---|
| 6,143,102 A | 11/2000 | Mendenhall et al. | |
| 2003/0145926 A1 | 8/2003 | Zeuner et al. | |
| 2005/0189052 A1 | 9/2005 | Zeuner et al. | |
| 2006/0175115 A1* | 8/2006 | Howard ................. | B60R 21/36 |
| | | | 180/274 |
| 2007/0240797 A1* | 10/2007 | Mendenhall ......... | C06B 23/007 |
| | | | 149/45 |
| 2009/0211671 A1 | 8/2009 | Yamato | |
| 2013/0233636 A1 | 9/2013 | Friedrich et al. | |

FOREIGN PATENT DOCUMENTS

| | | | |
|---|---|---|---|
| DE | 000J0000279MAZ | | 5/1952 |
| DE | 884170 | | 7/1953 |
| DE | 10230402 | * | 1/2004 |
| DE | 69730202 | | 1/2005 |
| EP | 1 006 096 | | 6/2000 |
| EP | 1 275 629 | | 1/2003 |
| GB | 656315 | | 8/1951 |

* cited by examiner

*Primary Examiner* — Aileen B Felton
(74) *Attorney, Agent, or Firm* — Tarolli, Sundheim, Covell & Tummino LLP

(57) ABSTRACT

The invention relates to gas generating compositions for use in safety devices for vehicles. In particular, the invention relates to said compositions based on guanidine nitrate used in pedestrian protection devices. The composition substantially comprises 75 to 98% by weight of guanidine nitrate as fuel and 2 to 25% by weight of a burn accelerator selected from the group of the transition metal compounds, the metal nitrates, metal chlorates, metal perchlorates, ammonium perchlorate and mixtures thereof, wherein the transition metal compounds are selected from the compounds of the transition metals Ti, Cr, Mn, Fe, Cu, Zn, Zr and Mo and wherein the gas generating composition exhibits a burn rate of from 3 to 17 mm/s at 20 MPa.

25 Claims, No Drawings

GAS GENERATING COMPOSITION AND USE THEREOF IN PEDESTRIAN PROTECTION DEVICES

RELATED APPLICATIONS

This application is a divisional of U.S. patent application Ser. No. 13/768,481, which was filed on Feb. 18, 2013.

BACKGROUND

The invention relates to gas generating compositions, especially for use in safety devices for vehicles. In particular, the invention relates to such compositions based on guanidine nitrate used in pedestrian protection devices.

Gas generating compositions based on guanidine nitrate are known, for example, from EP-A 1 006 096 and U.S. Pat. No. 6,143,102. Almost all manufacturers of vehicle occupant restraint systems make use of such compositions in series production of pyrotechnical inflators for airbag modules of occupant protection devices, especially for driver and passenger airbags. The compositions comprising guanidine nitrate as fuel commonly used for said applications have a mass-related gas yield of approx. 65 to 75%, bum rates of approx. 20 to 30 mm/s and combustion temperatures of about 1700 to 2000 K. The share of guanidine nitrate in these compositions frequently is within the range of from 40 to 50 % by weight.

For the use of airbag modules in the interior of the vehicle increased requirements to the generated propellant are applicable, because the latter can enter into the passenger compartment via discharge orifices in the airbag. The limits of gas components such as CO, $NH_3$ and $NO_x$ required m the specifications of the car manufacturers can only be reached by fuel mixtures having a substantially balanced oxygen balance. Therefore the percentage of guanidine nitrate in the gas generating compositions for airbag modules is limited to approx. 65% by weight, and apart from guanidine nitrate considerable percentages of oxidizing agents have to be employed. Since the oxidizing agents usually do not completely contribute to the gas generation, the possible gas yield of those compositions is reduced. Also for compositions having low burn temperatures which positively influence the noxious gas composition a higher percentage of non-gas generating additives has to be accepted, which equally affects the gas yield. The gas yields that can be obtained by the gas generating compositions comprising guanidine nitrate as fuel common so far thus do not amount to more than 75 %.

U.S. Pat. No. 6,893,517 describes gas generating compositions based on guanidine nitrate having a gas yield of about 80 %. These compositions contain further organic fuels and are formulated for use in belt tensioners. The compositions therefore have a definitely higher burn temperature of more than 2000 K and a high burn rate of more than 40 mm/s at 20 MPa.

Pure guanidine nitrate shows no self-retaining and complete disintegration after ignition. Therefore U.S. Pat. No. 2,604,391 suggests improving the ignition behavior and the burn characteristics of guanidine nitrate by appropriate additives. By the addition of copper and copper compounds to guanidine nitrate, gas generating compositions having a burn rate of about 1mm/s at 0.9 MPa are obtained. By adding vanadium pentaoxide the burn rate is intended to be increased. However, vanadium pentaoxide is toxic and is excluded from applications in the automotive industry.

The burn rates required for gas generating compositions for occupant protection systems (driver, passenger and side impact systems) in general are within >20 mm/s. As a result, in the commonly used fabric thicknesses of the propellant members (in general tablets) of 1 to 2 mm the burning is completed after a maximum of 100 ms. In this case, by the fabric thickness the layer thickness of a propellant member is understood which is passed during burning of the propellant member until complete consumption thereof. For example, a cylindrical tablet having a diameter of 6 mm and a height of 3 mm has a fabric thickness of 1,5 mm, as in the case of even burning from all sides after burning of a layer thickness of 1.5 mm the entire tablet is consumed.

However, for pedestrian protection applications at the exterior of the vehicle to protect the pedestrian against impacting on the hood or the windscreen, gas delivery times of more than 100 ms are desired. Moreover the inflated airbag is intended to have an as long durability as possible. For this purpose, it is advantageous when the temperature of the gas generated for inflating the airbag is as low as possible so as to keep the pressure loss due to cooling of the gas low.

It is the object of the invention to provide gas generating compositions by which longer gas delivery times and an improved durability of the protective devices activated by the release of gas can be achieved and which are suited for pedestrian protection applications.

This object is achieved by a gas generating composition according to claim 1.

The subject matter of the invention also is a pedestrian protection device in vehicles in which the gas generating composition according to the invention is contained as well as the use of the gas generating compositions according to the invention in pedestrian protection devices of vehicles.

Advantageous embodiments of the invention which can be optionally combined with each other are stated in the subclaims.

DESCRIPTION

The gas generating composition according to the invention serves for use in safety devices for vehicles and exhibits a gas yield of at least 85%. The composition substantially comprises 75 to 98% by weight of guanidine nitrate as fuel and 2 to 25% by weight of a burning accelerator selected from the group of the transition metal compounds, metal nitrates, metal chlorates, metal perchlorates, ammonium perchlorate and mixtures thereof. The burn rate of the composition is within the range of from 3 to 17 mm/s at 20 MPa.

Transition metal compounds in accordance with the invention are the compounds, preferably the oxides, hydroxides, carbonates, basic carbonates and basic nitrates, of the metals of me first series of the transition metals, namely of titanium, chromium, manganese, iron, copper and zinc, as well as of zirconium and molybdenum of the second transition metal series.

The compounds of the metals vanadium, cobalt and nickel as well as cadmium and mercury, which are undesired because of their toxicological characteristics, are not in accordance with the invention and are expressly excluded. Equally undesired are the compounds of the hexavalent chromium. The use of said metals and the compounds thereof is explicitly excluded in most specifications of the oar manufacturers anyway.

Metal nitrates, metal chlorates and metal perchlorates are especially those compounds of the alkali metals and earth alkali metals.

In accordance with a preferred embodiment, the molar gas yield of the gas generating composition amounts to at least 0.035 mole/g (moles of generated gas/g of fuel), especially preferred to 0.039 to 0.043 mole/g, and the volume-related gas yield (moles of generated gas/volume of fuel) amounts to at least 0.059 mole/cm$^3$, especially preferred to 0,059 to 0.062 mote/cm$^3$.

The theoretic molar gas yield for pure guanidine nitrate is 0.042 mole/g; the theoretical volume-related gas yield is 0.061 mole/cm$^3$ calculated each for a pressure of 30 MPa. Slightly higher molar or volume-related gas yields can be achieved by appropriate burning accelerators which reduce the molar weight of the generated gas and/or increase the density of the gas generating composition.

The burn rate of the gas generating compositions used in airbag modules for pedestrian protection devices outside the passenger compartment preferably is within the range of from 7.0 to 16.0 mm/s at 20 MPs. If the gas generating compositions in micro inflators are used to activate stays for hoods and similar pedestrian protection devices in which the gas released from the composition actuates a cylinder-piston mechanism, the burn rate preferably is within the range of from 10 to 17 mm/s at 20 MPa. For quick applications small tablets having a diameter of 1-4 mm or else granules can be employed.

The joint grinding of the components for example in a bail mill, vibration ball mill or rocker mill has turned out to be an efficient method of increasing the burn rate of a given composition. With the aid of the grinding bodies, on the one hand the particle size of the components used is reduced and, on the other hand, high homogeneity is achieved by intimately mixing and pressing the individual parts into each other. Both factors promote an increase in reactivity of the components used and thus also in the burn rate. Through the duration of the joint grinding and homogenizing as well as the grain size of the initial compounds the burn rate of the mixtures can be widely controlled. Thus definitely higher burn rates than in the propellants described in U.S. Pat. No. 2,604,391 can be reached even with a nominally equal composition.

Further the use of a fine-particle quality of the transition metal compound having a medium grain size of not more than 5 μm and a specific surface of at least 1 m$^2$/g is preferred.

With a mixture of 94.5% of guanidine nitrate, 5% of copper oxide and 0.5% of calcium stearate a burn rate of 6.2 mm/s at 20 MPa could be obtained in this way. The copper oxide quality used as starting material had a mean grain size of 0.8 μm and a specific surface of 10 m$^2$/g. The guanidine nitrate used had a mean grain size of 6.5 μm. However, it turned out that the grain size of the guanidine nitrate used as starting material is of minor significance, as a coarser grain size can be compensated by a longer grinding time.

The gas generating composition preferably has an oxygen balance of −10% to −27%, especially preferred of −14 to −24. The low oxygen balance contributes to a high gas yield and a low burning temperature. An unfavorable influence on the carbon monoxide parts can be tolerated, as the gases released during burning of the composition do not enter into the passenger compartment.

The oxygen balance is understood to be the oxygen quantity in percent by weight which is freed in the case of complete conversion of a compound or a mixture into $CO_2$, $H_2O$, $N_2$, $Al_2O_3$, $B_2O_3$ etc. (oxygen over-balancing). If the oxygen present is not sufficient for this purpose, the missing quantity required for the complete conversion is indicated with negative sign (oxygen under-balancing).

In accordance with an especially preferred embodiment, the compositions according to the invention are thermally shelf-stable at 120° C. for 400 h. The loss of weight in the hot storage test in the afore-mentioned conditions preferably is less than 2%, especially preferred less than 1%, Thus the compositions according to the invention also satisfy the specifications of the car manufacturers for applications in the engine compartment.

The compositions according to the invention preferably exhibit a burning temperature of no more than 1660 K. Preferably the burning temperature is within the range of from 1370 to 1650 K, especially preferred within the range of from 1420 to 1630 K. The provision of cold gases is equally advantageous to applications in the area outside the passenger compartment and promotes a longer durability of the inflated airbag or lbs safety device activated by gas pressure.

The burning accelerator is preferably selected from the group consisting of $TiO_2$, $Cr_2O_3$, $MnO_2$, $Fe_2O_3$, $Fe_3O_4$, $CuO$, $Cu_2O$, $ZnO$, $ZrO_2$, $MoO_3$, $FeOOH$, $Cu(OH)_2$, $ZnCO_3$, $MnCO_3$, $FeCO_3$, $CuCO_3$, basic zinc carbonate, basic copper carbonate, basic copper nitrate, basic zinc nitrate, $NaNO_3$, $KNO_3$, $Sr(NO_3)_2$, $NaClO_3$, $KClO_3$, $NaClO_4$, $KClO_4$, $NH_4ClO_4$ and mixtures thereof.

According to an especially preferred embodiment of the composition according to the invention the burning accelerator is a mixture of at least one compound from the group of the metal nitrates, metal chlorates, metal perchlorates and ammonium perchlorate as well as additionally of at least one transition metal compound of Ti, Cr, Mn, Fe, Cu, Zn, Zr and Mo. By this embodiment a high gas yield is obtained at a sufficient burn rate and a simultaneously low burning temperature.

Preferably the compound is selected from the group of the metal nitrates, metal chlorates and metal perchlorates from the group consisting of $NaNO_3$, $KNO_3$, $Sr(NO_3)_2$, $NaClO_3$, $KClO_3$, $NaClO_4$, $KClO_4$ and mixtures thereof. The use of ammonium perchlorate is also provided in this embodiment.

In the described embodiment the transition metal compound is preferably selected from the group consisting of $TiO_2$, $Cr_2O_3$, $MnO_2$, $Fe_2O_3$, $Fe_3O_4$, $CuO$, $Cu_2O$, $ZnO$, $ZrO_2$, $MoO_3$, $FeOOH$, $Cu(OH)_2$, $ZnCO_3$, $MnCO_3$, $FeCO_3$, $CuCO_3$, basic zinc carbonate, basic copper carbonate, basic copper nitrate, basic zinc nitrate and mixtures thereof.

The transition metal compounds preferably have a mean grain size of not more than 5 μm, especially preferred of not more than 3 μm and a specific surface of at least 1 m$^2$/g, especially preferred at least 3 m$^2$/g.

In addition to guanidine nitrate as fuel and the aforementioned burn accelerators, the composition according to the invention may comprise up to 5% by weight of further additives from the group of burn moderators and/or coolants. The afore-mentioned additives have a stabilizing effect on the burning and keep the combustion temperature low. Simultaneously the shagging of combustion residues is improved, thereby the residues being prevented from dusting.

Examples of appropriate burn moderators and/or coolants are $B_2O_3$, $Al_2O_3$, $MgO$, $SiO_2$, $Mg(OH)_2$, basic magnesium carbonate, $CaCO_3$ and mixtures thereof.

Further the compositions may include up to 3% of processing aids such as pressing aids, anti-caking agents and/or anti-blocking agents which in the given amount do not substantially influence the burn rate of the composition.

Examples of appropriate processing aids are polyethylene glycol, cellulose, methyl cellulose, graphite, wax, calcium stearate, magnesium stearate, zinc stearate, boron nitride, talcum, bentonite, silica and molybdenum sulfide as well as mixtures thereof.

A subject matter of the invention further is a pedestrian protection device for a vehicle comprising an inflator and means for pedestrian protection adapted to be activated by gas such as an inflatable airbag or a piston-cylinder system for propping up the hood in which the inflator contains a gas generating composition according to the invention in accordance with one or more of the afore-described embodiments.

The inflator of the pedestrian protection device is preferably disposed outside a passenger compartment of the vehicle, for example in the engine compartment. In such embodiment especially the improved hot shelf life of the composition according to the invention is advantageous.

According to a special embodiment of the pedestrian protection device according to the invention, the inflator interacts with an inflatable airbag. In the case of collision of the vehicle with a pedestrian, the risk of injury of the pedestrian can be considerably reduced by the inflated airbag.

According to a further embodiment of the pedestrian protection device, the inflator drives the piston-cylinder system of a hood stay. Thus an impact of the pedestrian on the windscreen of the vehicle can be prevented and the risk of cuts due to the breakage of glass can be reduced.

Finally, a subject matter of the invention also is the use of the gas generating compositions according to the invention in accordance with one or more of the afore-described embodiments in an inflator of a safety device in a vehicle, wherein the inflator is disposed outside a passenger compartment of the vehicle.

Especially preferred is the use of the gas generating compositions in a pedestrian protection device for vehicles.

The advantages of the gas generating compositions according to the invention especially reside in the fact that high gas yields can be achieved with simultaneously low combustion temperatures and moderate burn rates ensuring a long gas delivery time and a longer durability of the safety devices activated by gas. The burn rates obtained by the compositions according to the invention are below the burn rates of compositions previously used for airbag modules in the field of occupant protection, but at the same time still within a range suited for the use in pedestrian protection devices.

The high thermal stability of the compositions according to the invention furthermore also permits the use thereof in the engine compartment of vehicles where temperatures of up to 120° C. can easily be reached in operating conditions.

Finally the compositions according to the invention resort to tested and non-toxic components which are available on the market at reasonable prices.

The invention shall now be described by way of preferred embodiments which are not to be understood in a limiting sense, however.

Embodiments 1 Through 18

Guanidine nitrate having a mean particle size of from 8.5 to 35 μm, transition metal compounds having a mean particle size between 0.5 and 2 μm and a specific surface between 4 and 25 m$^2$/g, metal nitrates and perchlorates having a mean grain size of about 50 μm as well as pyrogenic aluminum oxide, silicon oxide and/or calcium stearate were mixed in the parts by weight listed in the following table 1, were ground together in a vibration ball mill and pressed into tablets.

TABLE 1

| Example No. | GuN | bCN | KClO$_4$ | KNO$_3$ | Sr(NO$_3$)$_2$ | CuO | Al$_2$O$_3$ | SiO$_2$ | Fe$_2$O$_3$ | Ca stearate |
|---|---|---|---|---|---|---|---|---|---|---|
| 1 | 87.5 | 10.0 | | | | | 2.0 | | | 0.5 |
| 2 | 92.5 | | 5.0 | | | 2.0 | | | | 0.5 |
| 3 | 92.5 | | | 5.0 | | 2.0 | | | | 0.5 |
| 4 | 89.5 | | | 5.0 | | 2.0 | | 3.0 | | 0.5 |
| 5 | 87.5 | 10.0 | | | | 2.0 | | | | 0.5 |
| 6 | 92.5 | | 5.0 | | | 2.0 | | | | 0.5 |
| 7 | 94.5 | | | | | 5.0 | | | | 0.5 |
| 8 | 89.5 | | | | | 10.0 | | | | 0.5 |
| 9 | 87.0 | | 7.5 | | | 2.0 | | 3.0 | | 0.5 |
| 10 | 87.0 | | | | 7.5 | 2.0 | | 3.0 | | 0.5 |
| 11 | 89.5 | | | 5.0 | | 2.0 | | 3.0 | | 0.5 |
| 12 | 92.5 | | | | | 5.0 | 2.0 | | | 0.5 |
| 13 | 89.5 | | 5.0 | | | 2.0 | | 3.0 | | 0.5 |
| 14 | 87.5 | | 5.0 | | | 5.0 | 2.0 | | | 0.5 |
| 15 | 81.0 | 10.0 | 5.0 | | | | 2.5 | 1.0 | | 0.5 |
| 16 | 76.0 | 15.0 | 5.0 | | | | 2.5 | 1.0 | | 0.5 |
| 17 | 92.5 | | 5.0 | | | | | | 2.0 | 0.5 |
| 18 | 89.5 | | 5.0 | | | | | | 5.0 | 0.5 |

The abbreviations used in table 1 mean as follows:
GuN=guanidine nitrate
bCN=basic copper nitrate The burn rate (BR) of the compositions according to the examples 1 through 18 was determined by bombarding 10 grams of propellant at a time within a closed 100 cm$^3$ bomb. The test results as well as further calculated characteristics of the compositions are listed in table 2.

TABLE 2

| | Characteristics | | | | | | |
|---|---|---|---|---|---|---|---|
| Example No | BR [mm/s] | T [K] | GA [%] | O$_2$ balance [%] | GA [mole/g] | density [g/ccm] | GA [mole/ccm] |
| 1 | 5.3 | 1427 | 92.6 | −21.3 | 0.039 | 23.71 | 0.060 |
| 2 | 11.4 | 1500 | 95.6 | −22.9 | 0.041 | 23.49 | 0.061 |
| 3 | 15.9 | 1447 | 94.9 | −23.2 | 0.040 | 23.51 | 0.060 |
| 4 | 10.8 | 1432 | 93.6 | −22.4 | 0.040 | 23.63 | 0.059 |

TABLE 2-continued

| Example No | BR [mm/s] | T [K] | GA [%] | O$_2$ balance [%] | GA [mole/g] | density [g/ccm] | GA [mole/ccm] |
|---|---|---|---|---|---|---|---|
| 5 | 5.7 | 1427 | 92.6 | −21.3 | 0.039 | 23.71 | 0.060 |
| 6 | 11.9 | 1500 | 95.6 | −22.9 | 0.041 | 23.49 | 0.061 |
| 7 | 6.2 | 1379 | 95.9 | −25.1 | 0.040 | 23.73 | 0.060 |
| 8 | 6.2 | 1384 | 91.9 | −22.8 | 0.039 | 23.79 | 0.060 |
| 9 | 15.3 | 1559 | 91.3 | −20.3 | 0.039 | 23.38 | 0.059 |
| 10 | 7.2 | 1498 | 90.1 | −20.9 | 0.039 | 23.38 | 0.059 |
| 11 | 9.7 | 1426 | 93.0 | −22.4 | 0.039 | 23.63 | 0.059 |
| 12 | 4.3 | 1370 | 93.9 | −24.6 | 0.040 | 23.73 | 0.060 |
| 13 | 10.1 | 1483 | 93.0 | −22.1 | 0.040 | 23.5 | 0.060 |
| 14 | 10.5 | 1499 | 91.2 | −21 | 0.039 | 23.53 | 0.060 |
| 15 | 11.2 | 1573 | 88.7 | −17.3 | 0.038 | 23.53 | 0.062 |
| 16 | 11.7 | 1625 | 85.8 | −14.5 | 0.037 | 23.2 | 0.059 |
| 17 | 13.5 | 1516 | 96.4 | −23.3 | 0.041 | 23.7 | 0.061 |
| 18 | 15.1 | 1503 | 93.5 | −22.5 | 0.039 | 23.71 | 0.060 |

The further abbreviations used in table 2 mean as follows:
T=combustion temperature, calculated in Kelvin
GA [%]=mass-related gas yield
GA [mole/ccm]=volume-related gas yield
GA [mole/g]=molar gas yield The compositions according to the examples 1 through 18 furthermore were submitted to an aging test for 400 hours at 120° C. After this test in general a loss of weight of less than 2% was determined. For the composition according to example 16 a loss of weight of merely 0.36% was determined. Thus all compositions satisfy the increased requirements to the aging stability of inflator propellants for applications in the engine compartment.

The afore-described burn tests moreover show the suitability of the compositions according to the invention for use in pedestrian protection devices.

The invention claimed is:

1. A gas actuated pedestrian protection apparatus for protecting a pedestrian located outside an occupant compartment of a vehicle, comprising:
a gas generating composition having a gas yield of at least 85%, the gas generating composition comprising 75 to 98 % by weight of guanidine nitrate as fuel and 2 to 25% by weight of a burn accelerator selected from the group of the transition metal compounds, the metal nitrates, metal chlorates, metal perchlorates, ammonium perchlorate and mixtures thereof;
wherein the transition metal compounds are selected from the compounds of the transition metals Ti, Cr, Mn, Fe, Cu, Zn, Zr and Mo;
wherein the gas generating composition has a burn rate of 3 to 17 mm/s at 20 MPa;
wherein the gas generating composition exhibits an oxygen balance of −10% to −27%; and
wherein the gas generating composition exhibits a combustion temperature of not more than 1650 K.

2. The pedestrian protection apparatus recited in claim 1, further comprising:
an inflator in which the gas generating composition is stored; and a pedestrian protection device adapted to be activated by gas produced by the gas generating composition.

3. The pedestrian protection apparatus recited in claim 1, wherein the oxygen balance is within the range of from −14 % to −24 %.

4. The pedestrian protection apparatus recited in claim 1, wherein the combustion temperature is within the range of from 1420 to 1630 K.

5. The pedestrian protection apparatus recited in claim 1, wherein the inflator is arranged outside a passenger compartment of the vehicle.

6. The pedestrian protection apparatus recited in claim 2, wherein the inflator interacts with an inflatable airbag for protecting a pedestrian outside a passenger compartment of the vehicle.

7. The pedestrian protection apparatus recited in claim 2, wherein the inflator drives a hood stay of the vehicle.

8. The pedestrian protection apparatus recited in claim 1, wherein the molar gas yield of the gas generating composition amounts to at least 0.035 mole/g.

9. The pedestrian protection apparatus recited in claim 1, wherein the volume-related gas yield of the gas generating composition amounts to at least 0.059 mole/cm$^3$.

10. The pedestrian protection apparatus recited in claim 1, wherein the burn rate is within the range of from 7 to 16 mm/s at 20 MPa.

11. The pedestrian protection apparatus recited in claim 1, wherein the burn rate is within the range of from 10 to 17 mm/s at 20 MPa.

12. The pedestrian protection apparatus recited in claim 1, wherein the composition is shelf-stable at 120° C. for 400 h.

13. The pedestrian protection apparatus recited in claim 1, wherein the transition metal compound is selected from the group of the transition metal oxides, transition metal hydroxides, transition metal carbonates, basic transition metal carbonates and basic transition metal nitrates.

14. The pedestrian protection apparatus recited in claim 1, wherein the transition metal compound has a mean grain size of not more than 5 μm and a specific surface of at least 1 m$^2$/g.

15. The pedestrian protection apparatus recited in claim 1, wherein the burn accelerator is selected from the group consisting of TiO$_2$, Cr$_2$O$_3$, MnO$_2$, Fe$_2$O$_3$, Fe$_3$O$_4$, CuO, Cu$_2$O, ZnO, ZrO$_2$, MoO$_3$, FeOOH, Cu(OH)$_2$, ZnCO$_3$, MnCO$_3$, FeCO$_3$, CuCO$_3$, basic zinc carbonate, basic copper carbonate, basic copper nitrate, basic zinc nitrate, and mixtures thereof.

16. The pedestrian protection apparatus recited in claim 1, wherein the burn accelerator is a mixture of at least one compound from the group of the metal nitrates, metal chlorates, metal perchlorates and ammonium perchlorate as well as additionally at least one transition metal compound of Ti, Cr, Mn, Fe, Cu, Zn, Zr and Mo.

17. The pedestrian protection apparatus recited in claim 1, wherein the compound is selected from the group of the metal nitrates, metal chlorates and metal perchlorates of the group consisting of NaNO$_3$, KNO$_3$, Sr(NO$_3$)$_2$, NaClO$_3$, KClO$_3$, NaClO$_4$, KClO$_4$, NH$_4$ClO$_4$ and mixtures thereof.

18. The pedestrian protection apparatus recited in claim 1, wherein the transition metal compound is selected from the group consisting of TiO$_2$, Cr$_2$O$_3$, MnO$_2$, Fe$_2$O$_3$, Fe$_3$O$_4$, CuO, Cu$_2$O, ZnO, ZrO$_2$, MoO$_3$, FeOOH, Cu(OH)$_2$, ZnCO$_3$, MnCO$_3$, FeCO$_3$, CuCO$_3$, basic zinc carbonate, basic copper carbonate, basic copper nitrate, basic zinc nitrate and mixtures thereof.

19. The pedestrian protection apparatus recited in claim 1, wherein the gas generating composition additionally comprises up to 5% by weight of burn moderators and/or coolants based on the total composition.

20. The pedestrian protection apparatus recited in claim 1, wherein the burn moderators and/or coolants are selected from the group consisting of $B_2O_3$, $Al_2O_3$, $SiO_2$, MgO, $Mg(OH)_2$, $MgCO_3$, basic magnesium carbonate, $CaCO_3$ and mixtures thereof.

21. The pedestrian protection apparatus recited in claim 1, wherein the gas generating composition additionally comprises up to 3% by weight of processing aids from the group of anti-caking agents, pressing aids and anti-blocking agents, based on the total composition.

22. The pedestrian protection apparatus recited in claim 1, wherein the processing aids are selected from the group consisting of polyethylene glycol, cellulose, methyl cellulose, graphite, wax, calcium stearate, magnesium stearate, zinc stearate, boron nitride, talcum, bentonite, silica and molybdenum sulfide as well as mixtures thereof.

23. A pedestrian protection apparatus for a vehicle, comprising:
   an inflator adapted to be arranged outside a passenger compartment of the vehicle to activate a pedestrian protection device for protecting a pedestrian outside a passenger compartment of the vehicle,
   wherein the inflator contains a gas generating composition having a gas yield of at least 85%, the gas generating composition comprising 75 to 98% by weight of guanidine nitrate as fuel and 2 to 25% by weight of a burn accelerator selected from the group of the transition metal compounds, the metal nitrates, metal chlorates, metal perchlorates, ammonium perchlorate and mixtures thereof;
   wherein the transition metal compounds are selected from the compounds of the transition metals Ti, Cr, Mn, Fe, Cu, Zn, Zr and Mo;
   wherein the gas generating composition has a burn rate of 3 to 17 mm/s at 20 MPa;
   wherein the gas generating composition exhibits an oxygen balance of −10 % to −27 %; and
   wherein the gas generating composition exhibits a combustion temperature of not more than 1650 K.

24. The pedestrian protection apparatus recited in claim 23, wherein the inflator is adapted to interact with an inflatable airbag for protecting a pedestrian outside a passenger compartment of the vehicle.

25. The pedestrian protection apparatus recited in claim 23, wherein the inflator is adapted to drive a hood stay of the vehicle.

* * * * *